(12) United States Patent
DiFoggio et al.

(10) Patent No.: US 7,559,358 B2
(45) Date of Patent: Jul. 14, 2009

(54) DOWNHOLE USES OF ELECTROACTIVE POLYMERS

(75) Inventors: Rocco DiFoggio, Houston, TX (US); Nigel Ryder, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 314 days.

(21) Appl. No.: 11/196,809

(22) Filed: Aug. 3, 2005

(65) Prior Publication Data
US 2007/0029197 A1    Feb. 8, 2007

(51) Int. Cl.
*E21B 34/06* (2006.01)
*F16K 31/02* (2006.01)
(52) U.S. Cl. ............... 166/66.6; 166/316; 251/129.06
(58) Field of Classification Search .............. 166/316, 166/65.1, 66.6, 66.7; 251/129.01, 129.06
See application file for complete search history.

(56) References Cited

U.S. PATENT DOCUMENTS

| | | | |
|---|---|---|---|
| 4,522,745 A | 6/1985 | Kurkov | |
| 4,715,469 A | 12/1987 | Yasuda et al. | |
| 4,979,585 A | 12/1990 | Chesnutt | |
| 5,438,169 A | 8/1995 | Kennedy et al. | |
| 6,015,266 A * | 1/2000 | Swatek | 417/53 |
| 6,179,066 B1 | 1/2001 | Nasr et al. | |
| 6,439,556 B1 | 8/2002 | Baudendistel et al. | |
| 6,568,470 B2 * | 5/2003 | Goodson et al. | 166/66.5 |
| 6,628,040 B2 | 9/2003 | Pelrine et al. | |
| 6,781,284 B1 | 8/2004 | Pelrine et al. | |
| 6,798,518 B2 | 9/2004 | DiFoggio et al. | |
| 6,940,211 B2 | 9/2005 | Pelrine et al. | |
| 6,998,999 B2 | 2/2006 | Fripp et al. | |
| 7,352,111 B2 * | 4/2008 | Bagwell | 310/328 |
| 2004/0008853 A1 | 1/2004 | Pelrine et al. | |
| 2005/0018192 A1 | 1/2005 | DiFoggio et al. | |
| 2005/0087339 A1 | 4/2005 | Schultz et al. | |
| 2005/0211937 A1* | 9/2005 | Popadiuc | 251/129.06 |
| 2006/0198742 A1* | 9/2006 | DiFoggio et al. | 417/410.1 |
| 2007/0184238 A1* | 8/2007 | Hockaday et al. | 428/98 |

OTHER PUBLICATIONS

Ron Pelrine, Roy Kornbluh, Jose Joseph, Seiki Chiba; Artificial Muscle for Small Robots, SRI International, pp. 1-5.

Roy Kornbluh, Ron Pelrine, Qibing Pei, Seajin Oh, Jose Joseph; Ultrahigh Strain Response of Field-Actuated Elastomeric Polymers, SRI International, Menlo Park, CA, pp. 1-14.

P. Sommer-Larsen, R. Kombluh; Polymer Actuators, pp. 1-8.

Moderator: Yoseph Bar-Cohen; EAP-in-Action Session, 2004 EAPAD Conference, San Diego, CA, USA, Mar. 15, 2004, pp. 1-9.

(Continued)

*Primary Examiner*—Kenneth Thompson
(74) *Attorney, Agent, or Firm*—Bracewell & Giuliani LLP

(57) ABSTRACT

A downhole actuator comprising a electroactive polymer, an advancement device, and an electrical source for stimulating the electroactive polymer. The advancement device is motivated by stimulation of the electroactive polymer. The electroactive polymer can be stimulated by the electrical source. The embodiments of the actuator can be utilized in subterranean downhole environments. Alternatively, the device can comprise a downhole acoustic source comprising an electroactive polymer.

4 Claims, 10 Drawing Sheets

OTHER PUBLICATIONS

Y. Bar-Cohen, T. Xue, M. Shahinpoor, J. Simpson, J. Smith; Flexible, Low-mass Robotic Arm Actuated by Electroactive Polymers and Operated Equivalently to Human Arm and Hand, Robotics 98: The 3rd Conference and Exposition/Demonstration on Robotics for Challenging Environments . . . .

Barbar J. Akle, Donald, J. Leo, Mike Hickner, James E. McGrath; Electroactive Polymers Based on Novel Ionomers; Proceedings of IMECE '03 2003 ASME Intern'l Mech Engr Congress, Washington, D.C., Nov. 15-21, 2003, pp. 1-8.

J.Y. Cohen; Electroactive Polymers as Artificial Muscles—A Primer; http://polysep.ucla.edu/Research%20Advances/EAP/electroactive_polymers_as_artifi.htm, pp. 1-13.

Kimberly Patch; Small Jolts Move Artificial Muscle; http://www.tmmag.com/Stories/2002/100202/Small_jolts_move_artificial_muscle_100202.html; pp. 1-3.

Roy Kornbluh, Ron Pelrine, Venkat Shastri; Electrostrictive Polymer Artificial Muscle Actuators for Biologically-inspired Robots; 1st NASA/JPL Workshop on Biomorphic Explorers, Aug. 1998, SRI International, pp. 1-19.

* cited by examiner

DOWNHOLE USES OF ELECTROACTIVE POLYMERS

BACKGROUND OF THE INVENTION

1. Field of the Invention

The invention relates generally to the field of hydrocarbon production. More specifically, the present invention relates to a downhole actuating device comprising an electroactive polymer.

2. Description of Related Art

With reference to FIG. 1, one example of a prior art actuating device is shown therein. There a downhole tool 10 is shown disposed in a well bore 5 tethered or supported with a wire line 12. As is well known in the art, such downhole tools can be in the form of an elongated apparatus known in the art as a sonde, where the actuating device is disposed within the sonde. With regard to the specific example of FIG. 1, the actuating device illustrated therein is a clamping device 14. The clamping device 14 comprises a linkage arm 18 pivotally connected to a clamping arm 16. The clamping device 14 operates by angular movement of the linkage arm 18. The linkage arm 18 is powered by a motor 24 via a drive nut 22 and drive screw 20. As shown, the motor provides a rotating force onto the drive screw 20, which by virtue of its threaded connection with the drive nut 22, upwardly motivates the drive nut 22 which in turn moves the linkage arm 18. With regard to this particular application, the sonde is an acoustic device having geophones. As is known in the art, proper operation of the geophones and/or accelerometers necessitates that the sonde be tightly pressed (i.e. coupled) against one side of the well bore 5.

However, one of the problems with such prior art devices is the large amount of weight and volume required by the clamping device 14 and its associated hardware. With regard to the clamping device 14 as shown, the motor 24 often occupies a substantial space and can have a large weight. Therefore there exists a need for the use of downhole actuation devices that can be utilized without the requirements of large weight and/or volume as well as the associated power requirements.

BRIEF SUMMARY OF THE INVENTION

The device of the present disclosure includes an actuator operable in a wellbore comprising, an electrical source, an electroactive polymer in communication with the electrical source, and an actuating device in cooperation with the electroactive polymer. The actuating device can comprise a ratcheting device and an advancement device, where the ratcheting device comprises a gearwheel having teeth set off at an angle and a pawl in operative cooperation with the teeth. The advancement device can further comprise a connecting rod operatively coupled to the electroactive polymer. The ratcheting device may comprise a planar member with a series of notches disposed on the planar member wherein the notches can couple with the advancement device. The electroactive polymer of the actuating device may optionally comprise two or more segments.

The ratcheting device for use with the actuator may be comprised of an elongated member and a series of notches disposed on the elongated member, wherein the notches are couplable with the advancement device. The actuator may further be housed within a downhole sonde housing. The sonde may further comprise an electrical source disposed thereto.

In an alternative embodiment, the actuator can further comprise a second actuating device. The actuator may also be coupled with a valve. The valve comprises a valve body having a slide selectively positioned within the valve body. Alternatively, the actuating device comprises a pivoting arm. The pivoting arm may be pivotally connected to a downhole sonde. The actuator can further comprise a pad connected to the free end of the pivoting arm.

In an alternative embodiment, the actuating device of the actuator, can comprise a piston in cooperation with a pump having a body. Also, the actuator can have an electroactive polymer comprising a compression element and a reciprocation element. The compression element and the reciprocation element can alternatively urge the piston into and out of the pump body thereby producing a reciprocating pumping action for pressurizing fluid within the pump.

The actuating device may be a tympanic member and may also be substantially planar. This embodiment may include an electroactive polymer attachable to the surface of the tympanic member where stimulation of the electroactive polymer bends the member thereby producing an acoustic signal.

Also disclosed herein is a spectrometer comprising, a spindle, a filter, an electrical source, and an electroactive polymer in communication with the electrical source and in cooperation with the filter. The spectrometer is disposable in a downhole sonde. The spectrometer is selected from the group consisting of a wavelength modulation spectrometer and a derivative spectrometer. The filter for use with the spectrometer is selected from the group consisting of an oscillating interference filter and a reciprocating linear variable filter. The filter for use with the spectrometer is rotatable upon the spindle. The rotational motion of the filter is provided by stimulation of the electroactive polymer.

Also disclosed herein is a vibration compensation device comprising, a compensating member mechanically coupled to a protected device, a feedback circuit in communication with the compensating member, and an electrical source in communication with the compensating member. The vibration compensation device can be housed within a downhole tool insertable within a wellbore. The vibration compensation device may further comprise an accelerometer coupled with the protected device. The protectable device couplable with the vibration compensation device is sensitive to shock, vibration, or acceleration.

Yet further disclosed herein is a downhole actuator useful to actuate a downhole component comprising, a motivating member, a series of notches formed on the motivating member, and an activating device selectively couplable with the notches. The activating device comprises an electroactive polymeric member. The downhole activating device may further comprise connecting members selectively couplable to the notches. The electroactive polymeric member of the downhole actuator may be comprised of at least two sections. The motivating member may have an elongated form or a planar form.

Also disclosed herein is a downhole actuator useful to activate a downhole component comprising, a means for providing a motivating force to the actuator. The means for providing a motivating force to the actuator comprises an electroactive polymer and a linkage system operatively coupled to the means and to the downhole component. The means of the downhole actuator may further comprise an electrical source. The linkage system of the downhole actuator comprises a connecting rod selectively couplable to a motivating member. The motivating member comprises notches formed to selectively couple with connecting rod and receive a motivating force from the electroactive polymer. The motivating member can have a planar or an elongated form.

Also disclosed herein is a fluid acoustic source comprising, an electrically responsive member and a support circumscribing the electrically responsive member. The electrically responsive member may be affixed to the support on its outer periphery. The fluid acoustic source may further comprise an electrical supply in electrical communication with the electrically responsive member. The electrically responsive material and support of the acoustic source is disposable in a body of water and wherein upon activation of the acoustic source by the electrical supply the acoustic source imparts a seismic signal into the body of water. Optionally, activation of the electrically responsive material by the electrical source causes vibration of the electrically responsive material at a frequency of from about 5 Hz to about 1000 Hz. Alternatively, the acoustic source may further comprise a towing vessel towingly attached to the acoustic source. A multiplicity of electrically responsive members may be included wherein each is affixed to a support on its outer periphery and wherein the multiplicity of electrically responsive members comprises an acoustic array. The acoustic source may further comprise a sonde, wherein the sonde is disposable in a wellbore having fluid. Moreover, when the sonde is disposed in wellbore fluid, application of an electrical signal from the electrical source to the electrically responsive member imparts an acoustic signal into the wellbore fluid. The acoustic signal imparted into the wellbore fluid is transmissible into the formation adjacent the wellbore.

DETAILED DESCRIPTION OF THE INVENTION

Figure 1:
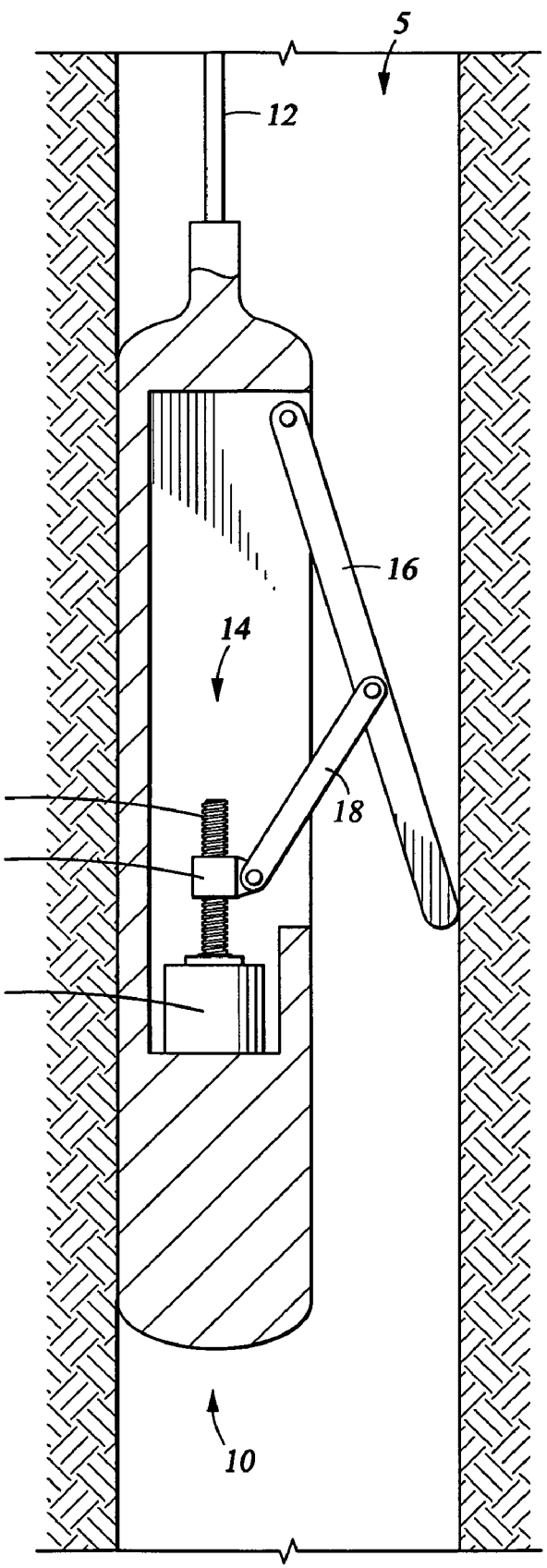
FIG. 1 illustrates a prior art downhole tool with a clamping device.

A new type of polymer has been developed that responds to external electrical stimulation with a significant change in shape or size. These materials are typically referred to as electroactive polymers, or more commonly EAPs. Generally, EAPs can induce strains that are as high as two orders of magnitude greater than the movements possible with rigid and fragile electroactive ceramics. EAP materials have higher response speeds, lower densities and improved resilience when compared to shape memory alloys. Electroactive polymers are flexible materials that are capable of converting energy in the form of electric charge and voltage to mechanical force and movement. They provide unique opportunities to integrate functions that are segregated in traditional designs. Electroactive polymers include those polymeric materials that exhibit piezoelectric, pyroelectric, or electrostrictive properties in response to electrical or mechanical fields.

Advantages of EAPs include the ability to operate in room conditions for long periods of time, rapid response time, can hold strains under direct current activation, and induce relatively large actuation forces. Some disadvantages include a high voltage requirement, a compromise between stress and strain, and a glass transition temperature that is inadequate for low temperature actuation tasks.

There are different types of EAP materials, for example Ionic EAPs exist that require low voltage, provide predominately bending actuation, and exhibit large bending displacements. However ionic EAPs do not hold their strain when exposed to direct current. Electric field or Coulomb forces generally drive electronic EAPs, while the primary driver for ionic EAPs is the mobility or diffusion of ions.

Poly(vinylidene fluoride) or PVDF and its copolymers are the most exploited ferroelectric polymers. They consist of a partially crystalline component in an inactive amorphous phase. Large applied AC fields (~200 MV/m) induce electrostrictive (non-linear) strains of nearly ~2%. P(VDF-TrFE) a PVDF polymer which has been subject to electron radiation has shown electrostrictive strain as high as 5% at lower frequency drive fields (150 V/mm). Ferroelectric EAP polymer actuators can be operated in air, vacuum or water and throughout a wide temperature range. Electrostatic fields can be employed to those polymers exhibiting low elastic stiffness and high dielectric constants to induce large actuation strain, these polymers are known as electro-statically stricted polymers (ESSP) actuators.

Dielectric EAP actuators require large electric fields (~100 V/mm) and can produce large strain levels (10-200%). It has been reported that an acrylic elastomer tape is capable of planar strains of more than 300% for biaxially symmetric constraints and linear strains up to 215% for uniaxial constraints. Electrostrictive Graft Elastomers is a polymer consisting of two components, a flexible macromolecule backbone and a grafted polymer that can be produced in a crystalline form. The material exhibits high electric field induced strain (~4%) combined with mechanical power and excellent processability.

A typical example is a combination of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Electrostrictive Paper is composed of a multitude of discrete particles, that are mainly of a fibrous nature forming a network structure. An example of which is silver laminated paper whereby two silver laminated pieces of paper with silver electrodes are placed on the outside surfaces. Upon electric voltage being applied to the electrodes a bending displacement occurs. These types of actuators are lightweight, simple to fabricate and are likely to be used in applications such as active sound absorbers, flexible speakers and "smart" shape control devices.

Electro-Viscoelastic Elastomers are composites of silicone elastomer and a polar phase. Upon curing an electric field is applied that orientates the polar phase within the elastomeric matrix. An applied electric field (<6 V/mm) induces changes in shear modulus. Liquid Crystal Elastomer (LCE) Materials posses EAP characteristics by inducing Joule heating. LCEs are composite materials consisting of monodomain nematic liquid crystal elastomers and conductive polymers, which are distributed within their network structure. The actuation mechanism is a phase transition between nematic and isotropic phases. The actuation takes place in less than a second.

Ionic Polymer Gel is a polymer gel having the potential of matching the force and energy density of biological muscles. The polyacrylonitrile materials are activated by chemical reaction(s), a change from an acid to an alkaline environment inducing an actuation through the gel becoming dense or swollen. The actuation is somewhat slow due to the diffusion of ions through the multilayered gel.

Ionomeric Polymer-Metal Composites (IPMC) can bend in response to an electrical activation as a result of the mobility of cations in the polymer network. IPMC require relatively low voltages to stimulate a bending response (1-10 V) with low frequencies below 1 Hz. Conductive Polymers (CP) actuate via the reversible counter-ion insertion and expulsion that occurs during redox cycling. Significant volume changes occur through oxidation and reduction reactions at corresponding electrodes through exchanges of ions with an electrolyte.

Electrodes are commonly fabricated from polypyrrole or polyaniline, or PAN doped with HCl. CP actuators require voltages in the range of 1-5 V. Variations to the voltage can control actuation speeds. Relatively high mechanical energy densities of over 20 J/cm3 are attained with these materials, however, they posses low efficiencies at levels of 1%.

Other material combinations for CP are polypyrrole, polyethylenedioxythiophene, poly(p-phenylene vinylene)s, polyaniline and polythiophenes. Some applications reported for these CPs are miniature boxes that have the ability to open and close, micro-robots, surgical tools, surgical robots that assemble other micro-devices.

Carbon Nanotubes (CNT) are formal EAPs with diamond-like mechanical properties. The actuation mechanism is through an electrolyte medium and the change in bond length via the injection of charges that affect the ionic charge balance between the nano-tube and the electrolyte. The more charges that are injected into the CNT the larger the dimension change. As a consequence of the mechanical strength and modulus of single CNTs and the achievable actuator displacements, these EAPs can boast the highest work per cycle and generate much higher mechanical stresses than other forms of EAPs Suitable electroactive polymer materials for the present invention include any substantially insulating polymer or rubber (or combination thereof) that deforms in response to an electrostatic force or whose deformation results in a change in electric field. More specifically, exemplary materials include silicone elastomers, acrylic elastomers such as VHB 4910 acrylic elastomer, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

The present invention involves a downhole actuator housed within a downhole tool 10 for use in activating certain components of downhole tools. More specifically, the downhole actuator of the present invention includes an electroactive polymer, where the electroactive polymer responsively expands when exposed to an applied electrical current. The actuator further comprises a linkage mechanism useful in transmitting the motive force of the electroactive polymer onto the component that is being activated by the system. Examples of components actuated by the downhole EAP actuator include clamping arm, a slip, anchors, a valve, and a pump. When operated at higher frequencies, the EAP could also be used as the actuator in a wavelength modulation spectrometer based on an oscillating interference filter (US 20050018192) or as the actuator in a derivative spectrometer based on a reciprocating linear variable filter (U.S. Pat. No. 6,798,518). EAPs could fill the need for much louder low-frequency (0-100 Hz) downhole acoustic sources. EAPs could also fill the need for downhole active vibration cancellation mounts for printed circuit boards, sensors, and other components.

Figure 2A:
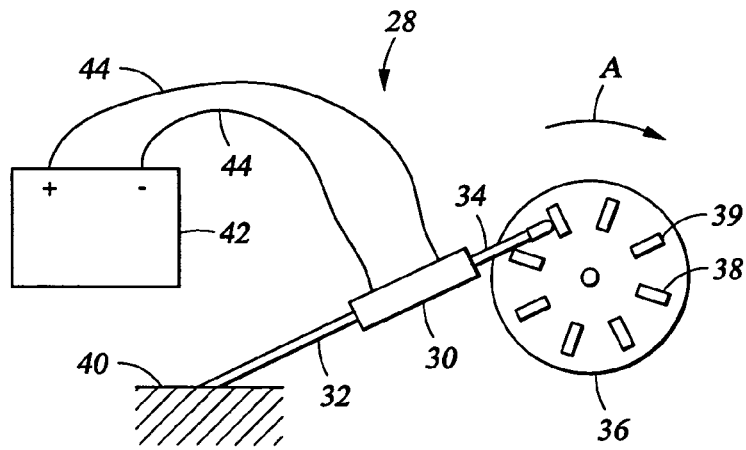
FIGS. 2a and 2b demonstrate in side view one embodiment of a downhole actuator.
Figure 2B:
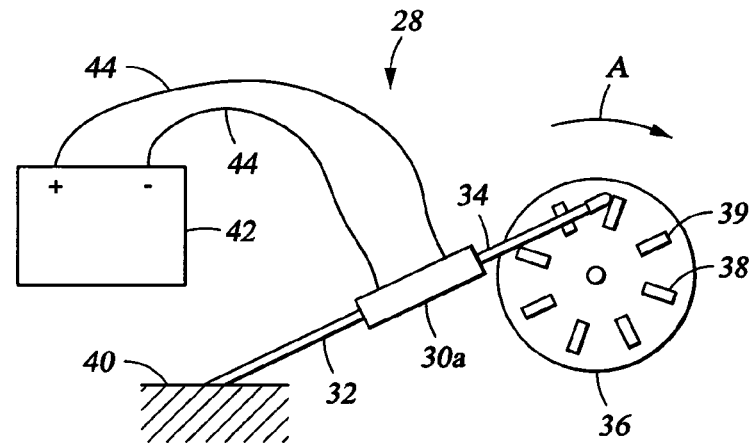

With reference to FIGS. 2a and 2b, one example of a downhole actuator is shown. With specific reference to FIG. 2a the embodiment of the downhole actuator comprises a first connecting rod 32, a segment of electroactive polymer 30 connected between the first connecting rod 32 and a second connecting rod 34. The combination of the electroactive polymer 30, the first connecting rod 32, and the second connecting rod 34 can create an advancement device that upon stimulation of the electroactive polymer 30 can impart a motivating force or motion onto another device or body. The unattached end of the second connecting rod 34 is shown operatively coupled to a notch 38 formed on a ratchet disk 36.

The ratchet disk 36 of FIGS. 2a and 2b is shown as a generally planner member. While shown in a generally radial form, the ratchet disk 36 can have any other suitable configuration, such as angular, triangular, or possibly a series of radial extending sprockets operatively cooperating with an outermost member of the advancement device, which as shown in FIGS. 2a and 2b can be a second connecting rod 34. Leads 44 provide for electrical current to and from the electroactive polymer 30 to an electrical supply 42. It should be pointed out that the electrical supply 42 can be in the form of a battery, can be received via the wire line 12, or it can be generated downhole with the use of a hydraulic motor or any other now known or later developed electrical current generating device.

As shown in FIG. 2a, the electroactive polymer 30 is shown in a relaxed state without the application of the electrical current. FIG. 2b however illustrates a stimulated and therefore expanded variant of the electroactive polymer 30a and indicates how the corresponding expansion of the polymer has extended the second connecting rod 34. As shown, expansion of the second expansion rod 34 in turn rotates the ratcheting disk 38 in a clockwise direction. The rotational direction of the ratcheting disk 36 is shown by the arrow A. Successively removing the application of electrical current from the electroactive polymer 30 causes the electroactive polymer 30 to retract into the state as shown in FIG. 2a.

Selectively coupling the second connecting rod 34 with an adjacent notch 39 disposed counterclockwise to the first notch 38 sets up the advancement device to rotate the ratcheting disk 36 upon expansion of the electroactive polymer member 30. Thus successive applications of electrical current to the electroactive polymer 30 will result in a continuous type rotation of the ratchet disk 36 as shown in the direction of the arrow A. Also as shown the end of the first connecting rod 32 not connected to the electroactive polymer 30 is connected to a base 40 which can be any secure location within the downhole tool in which the downhole actuator 28 is housed. Therefore the reciprocated action of the electroactive polymer 30 can be turned into a rotary motion for use in activation of the certain components of the downhole tool 10.

Figure 3:
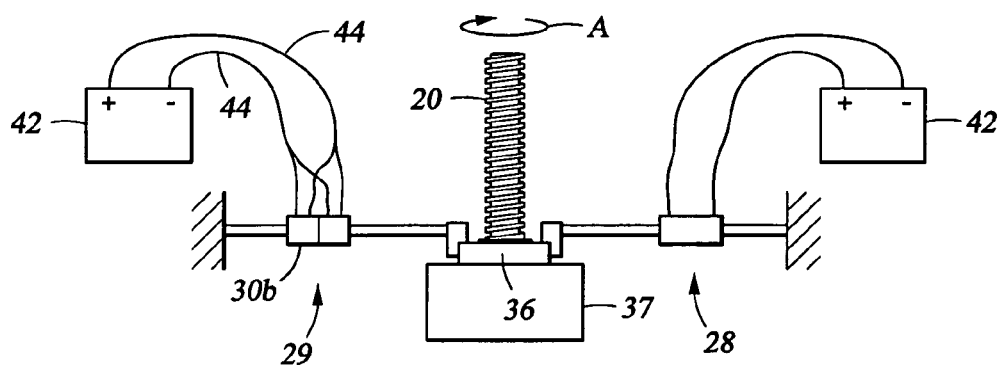
FIG. 3 depicts a side view of an alternative embodiment of a downhole actuator.

A further embodiment of a downhole actuator 28 is shown in FIG. 3. Here the ratchet disk 36 is affixed to a threaded drive screw 20 such that the reciprocation or rotation of the ratchet disk 36 causes rotation of the drive screw 20. As previously discussed, a drive nut (not shown) can be attached to the drive screw 20 for actuation of the components of the downhole tool 10. Preferably, the drive screw 20 is attached a foundation 37 for securing it within the housing of the downhole tool 10. With reference again to FIG. 3, it should be pointed out that here a second downhole actuator 29 is shown that is coupled to the drive screw 20 for rotating the drive screw 20 in a direction opposite to that rotated by the first downhole actuator 28. Rotating the drive screw 20 in an opposite direction would allow for retraction of any such mechanism initially activated by the downhole actuator 28.

In yet another alternative embodiment of a downhole actuator, the electroactive polymer 30b of the downhole actuator 29 is comprised of at least two distinct segments of an electroactive polymer material. Accordingly, the present invention is not limited to downhole actuators having a single segment of electroactive polymer, but can comprise two or more such segments.

Figure 4:
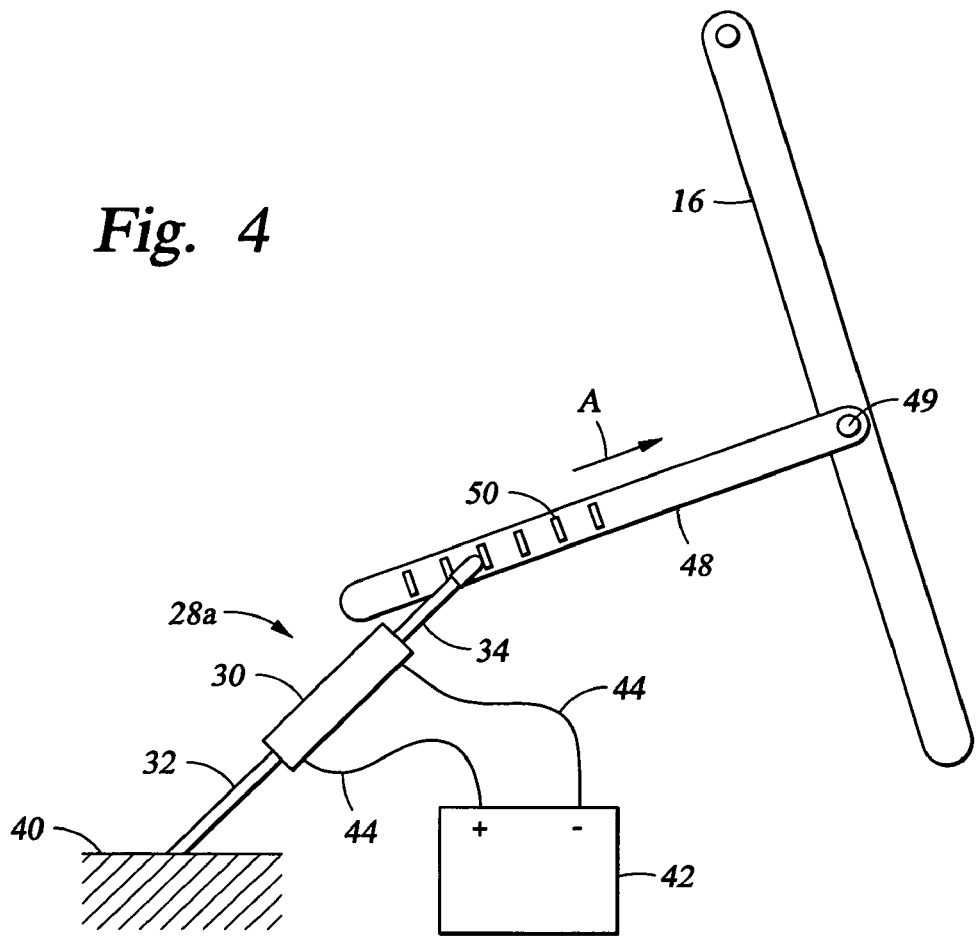
FIG. 4 portrays a side view of an embodiment of a downhole actuator.

With reference now to FIG. 4 another alternative embodiment of a downhole actuator 28a is illustrated. Here the actuator comprises a first connecting rod 32 secured to a base 40 on one side and the electroactive polymer 30 on the other. On the opposite side of the electroactive polymer 30 a second connecting rod 34 is attached thereto. The free end of the second connecting rod 34 can be selectively coupled with a drive rod 48 having a series of indentations or drive rod notches 50 disposed on the outer surface of the drive rod 48. On the end of the drive rod 48 opposite to the second connecting rod 34 is a pivoting connecting 49 where the drive rod is pivotally connected to clamping arm 16. As with the embodiments having the ratchet disk 36, successive application of electrical energy to the electroactive polymer 30 can extend the drive rod 48 outward against the clamping arm 16 thereby driving the clamping arm 16 into a desired disposition. It is believed that it is within the capabilities of those skilled in the art to form a downhole actuator having notches, or sprocket like connectors for advancing or transmitting a moving force throughout the linkage system as herein described.

Figure 5:
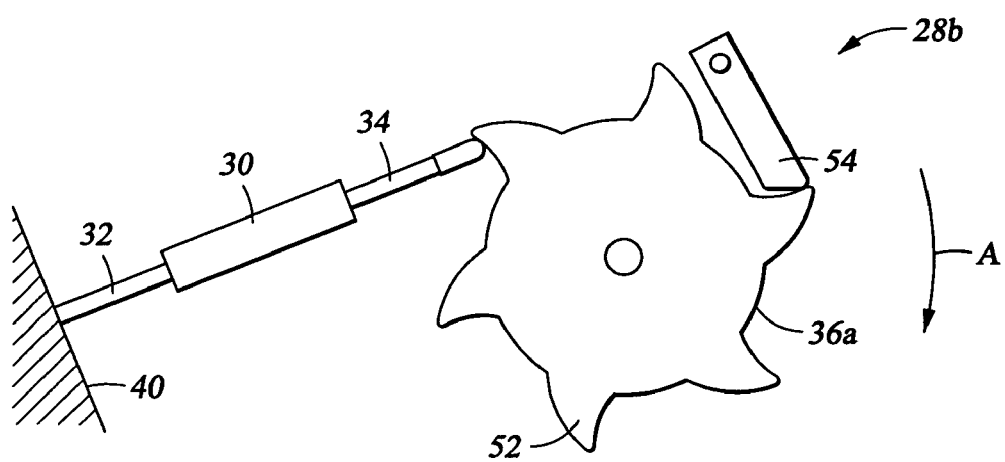
FIG. 5 illustrates a side view of a downhole actuator.

FIG. 5 illustrates a downhole actuating device 28b similar to that as shown in FIGS. 2a and 2b. However instead of having notches disposed on one side of a planar disk, teeth 52 are disposed on the out circumference of a ratchet disk 36a. It should be pointed out that the ratcheting device of the present invention includes any type of actuating element having notches or teeth formed thereon wherein a reciprocating motion can then impart either linear or rotational motion upon that notched or teeth member. As is known in the art a tangential force applied to the flat side of these teeth 52 can rotate the disk in the direction of the arrow A. Rotation of the ratchet disk 36 opposite to the direction of the arrow A can be prevented by the presence of the pivoting pawl 54. In yet another alternative, the actuator of FIG. 5 is interchangeable with the combination shown in FIG. 3.

In each of the configurations shown herein, as well as other equivalent movement devices, the members that receive the motivating force from the advancement device would act as a motivating member by imparting a motivating force onto the actuator disposed in the sonde. The linkage systems disclosed herein, i.e. the combination of elements that serve to transfer the motivating force from expansion of the electroactive polymer onto the downhole component being actuated, could be expanded beyond the embodiments shown herein. Moreover, the use of a gearing system or multiple linkage systems could be employed as well.

Figure 6A:
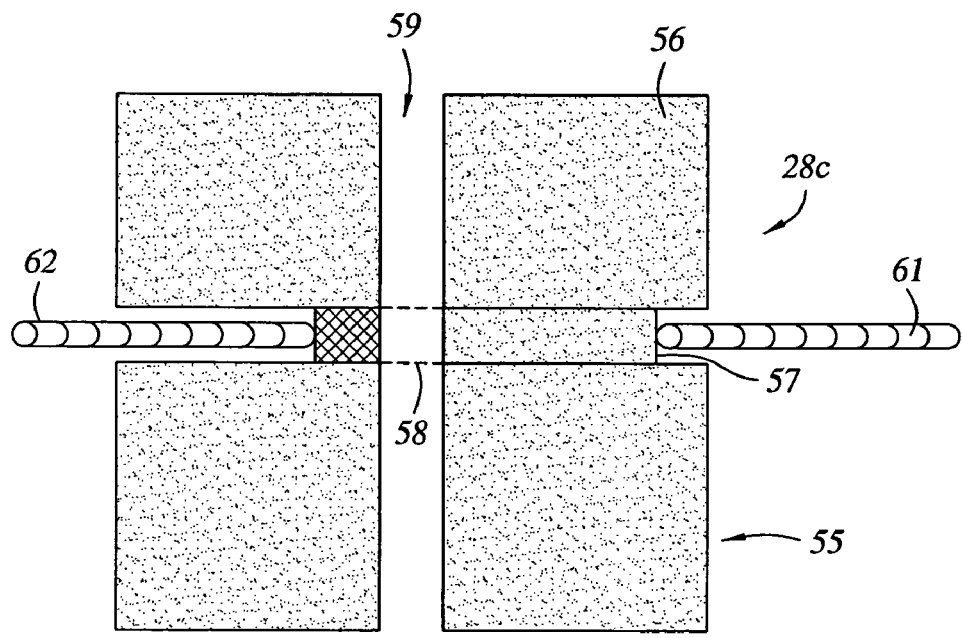
FIGS. 6A and 6B illustrates a partial cutaway view of an embodiment of an actuator in an open and in a closed position.
Figure 6B:
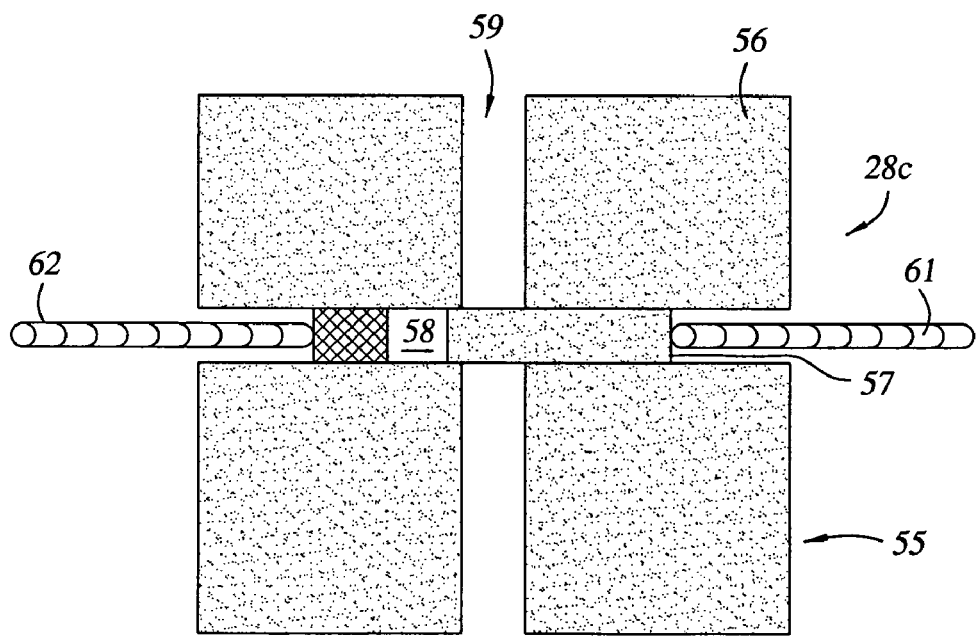

In the embodiment shown in FIGS. 6a and 6b, the downhole actuator 28c is used in conjunction with a valve 55. The valve is comprised of a valve body 56 with a passage 59 formed through the body for allowing the passage of fluid there through. A slide 57 is provided within the valve body 56 that is disposed perpendicular to the passage 59. This slide is provided with a slide aperture 58 and that is alignable with the passage 59 for allowing fluid flow through the valve 55. Accordingly selective placement of the slide 57 within the valve body 56 regulates the flow of fluid through the valve 55.

With regard to the present disclosure, the selective placement of the slide 57 is accomplished by the addition of a first member 61 and a second member 62. Preferably these members are formed from an EAP material, or some other polymeric material responsive to the application of an electrical current or voltage. As shown in FIG. 6a, the valve with valve slide 57 is in the open position, such that the slide aperture 58 is aligned with the passage 59 to allow for fluid flow. Selectively actuating the valve 55 into its open position can be accomplished by contracting the first member 61 while simultaneously allowing the second member 62 to be in a relaxed state. As previously discussed activation of electrically responsive materials can be accomplished by the application of electricity via an electrical source (not shown).

With reference now to FIG. 6b, the valve is shown in a closed position, wherein the aperture is urged into the valve body and out of communication with the passage 59. Movement of the slide 57 can be accomplished from the open to the closed position by activating the second member 62 while allowing the first member 61 to be in a relaxed state (i.e. removal of an applied electrical current or voltage). It is well appreciated that the valve configuration used in conjunction with the first and second members (61,62), is not limited to the slide valve as disclosed herein. Note other types of valves can also be used with this inventive concept, such as gate valves, rotary valves, ball valves, and the like.

Figure 7:
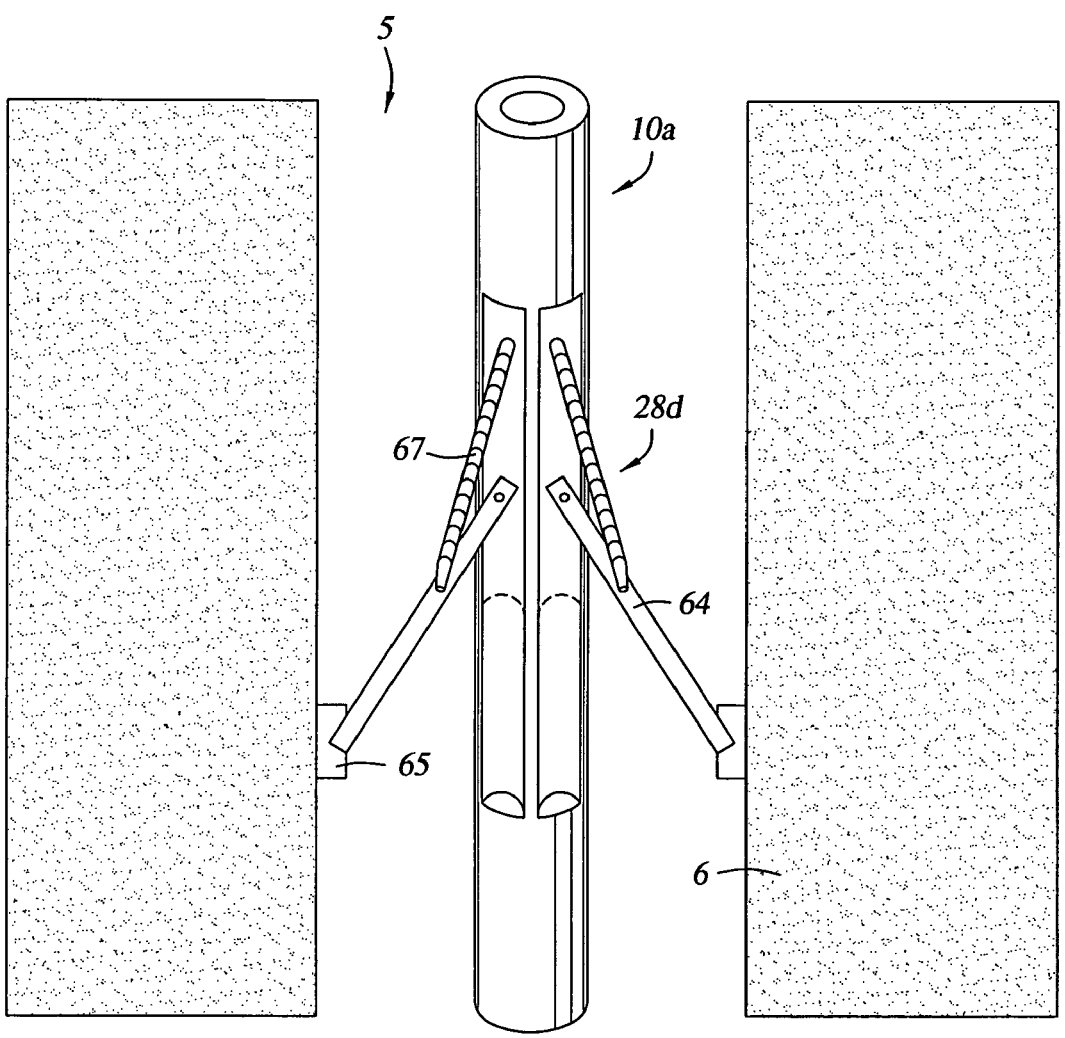
FIG. 7 depicts a side-view of an embodiment of a downhole actuator.

In FIG. 7, the embodiment of the downhole actuator 28d is shown as part of a downhole tool 10a having a tool arm 64 connected to the downhole tool 10a. As shown, the tool 10a is in a two arm configuration that can be pivotally extended from the downhole tool 10a into contact with the surrounding inner diameter 6 of the wellbore 5. Pads 65 are provided on the free end of the tool arm 64 for contact with the wellbore inner diameter 6. Here a deployment member 67 is shown connected along a length of the tool arm 64 on one end and to the tool body 10a on the other end of the deployment member 67. As with the other actuators, the deployment member 67 is preferably comprised of an EAP or similar material, i.e. one that is responsible to the application of electrical voltage or current. The deployment members 67 of FIG. 7 are shown in a contracted state thus responding to the application of external electricity. Subsequent deactivation of the applied electrical current or voltage can allow the deployment member 67 to relax and the tool arm to retract back to the tool housing. This embodiment is particularly useful for tools that have one or more pads on one or more extendable arms, which make their measurements with these pads in contact with the wall of the well. Examples of such tools include Baker Hughes' Earth Imager and STAR Imager (resistivity based formation imagers), Hexagonal Diplog (for determining bedding plane dip), and pad-based acoustic tools. It could also be used to extend the backup arms or the fluid recovery probes in Baker Hughes' Reservoir Characterization Instrument (RCI).

Figure 8:
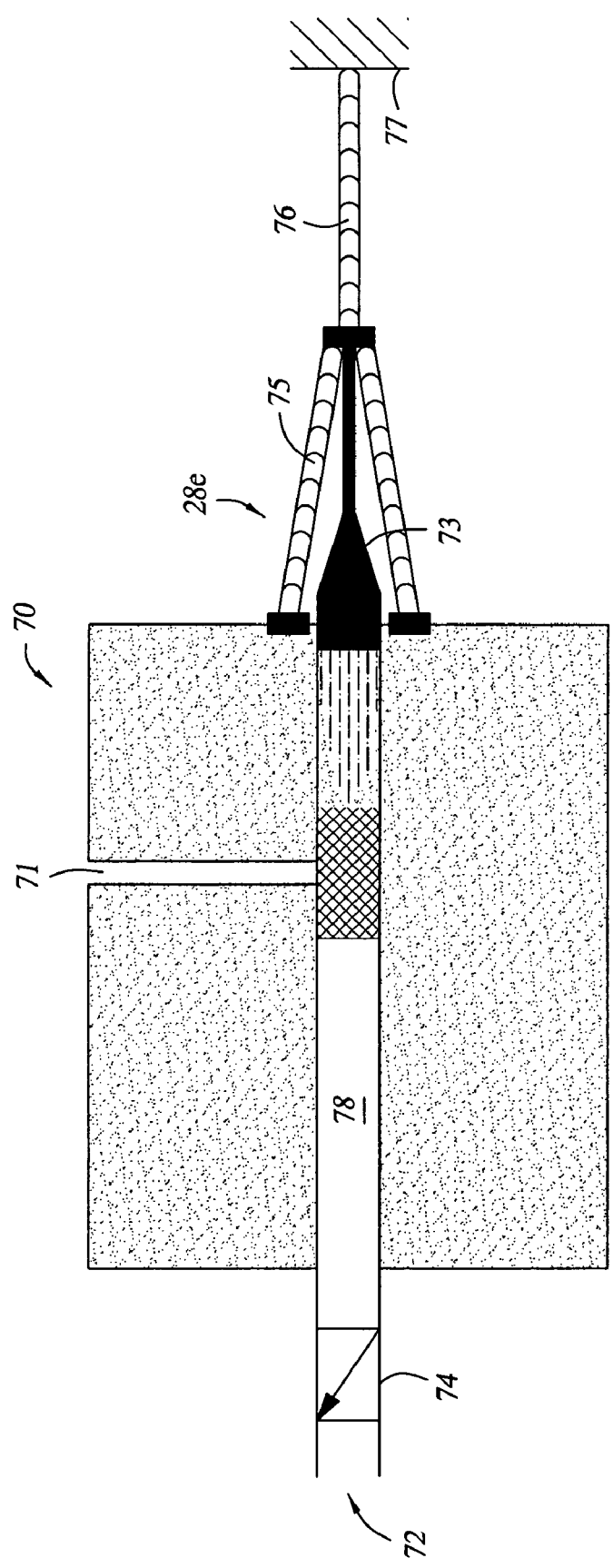
FIG. 8 is a partial cutaway view of an embodiment of an actuator.

In the embodiment of the downhole actuator 28e as shown in FIG. 8, the actuator 28e is used in a pumping application. A pump 70 is shown having a piston 73, where the piston is reciprocatingly disposed in an axial passage 78 formed along the body of the pump 70. Reciprocation of the piston 73 is accomplished by the implementation of both a compression element 75 and a reciprocation element 76. As shown, the compression element 75 is attached on one end to the free end of the piston 73 and on the other end to the body of the pump. The reciprocation element 76 is also attached to the free end of the piston on one of its ends and to a static base 77 on its other end. As with the other actuators disclosed herein, the preferred material for both the compression and reciprocation element (75, 76) is comprised of an EAP, or polymeric electrically responsive material. Accordingly, activation of the compression element 75 contracts these elements thereby pushing the piston through the passage 78. During the compression stroke any fluid lying within the passage will be urged outward through the pump discharge 72. The presence of a check valve 74 proximate to the open end of the pump discharge 72 serves to prevent fluid flow back into the pump 70.

Stimulating the reciprocation element 76 in conjunction with relaxing the compression element 75 enables contraction of the reciprocation element 76 thereby pulling the piston out of the passage towards the support base 77. A pump inlet 71 is formed on one side of the pump body, through the body of the pump 70, and onto the pump passage 78. Selective and sequential activation and deactivation of the compression and reciprocation elements (75,76) ultimately results in a pumping action for motivating pressurized fluid through the pump 70. Continued rearward urging of the piston will result in the piston moving behind the pump inlet 71, thereby allowing fluid flow from the exterior of the pump 70 into the pump passage 78.

Figure 10:
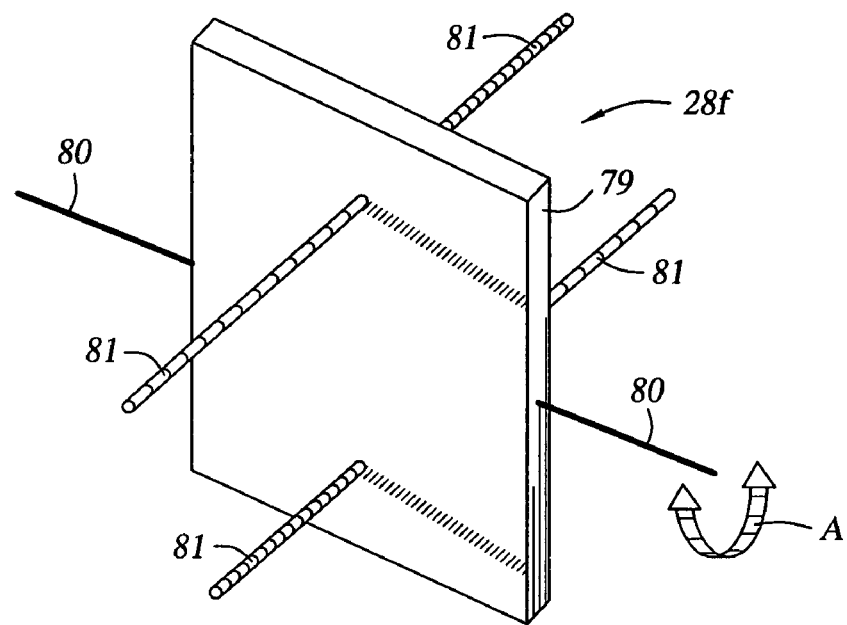
FIG. 10 is a perspective view of an embodiment of an actuator used with an interference filter.

With reference now to FIG. 10, an embodiment of a downhole actuator 28f is shown in combination with an optical filter 79. The filter 79 can be used in conjunction with a wavelength modulation spectrometer or a derivative spectrometer. When used in conjunction with the wavelength modulation spectrometer, the filter 79 would act as an oscillating interference filter. A wavelength modulation spectrometer as discussed in detail can be found in pending patent application having publication No. 20050018192 filed Apr. 20, 2004, which is assigned to the assignee of the current application. The disclosure of this application is incorporated by reference herein in its entirety.

When used as a derivative spectrometer, the filter 79 would act as a reciprocating linear variable filter. An example of a derivative spectrometer is discussed in U.S. patent application Ser. No. 6,798,518, issued to DiFoggio on Sep. 28, 2004. DiFoggio '518 is also assigned to the assignee of the current application. The disclosure of DiFoggio '518 is incorporated by reference herein in its entirety. In operation, the filter 79 of FIG. 10 is mounted on a pivoting spindle 80, actuation of the filter 79 about the spindle 80 is accomplished by the connection of at least two actuating members 81 to the filter 79. As shown, compression of an actuating member 81 on one side of the filter while allowing relaxation of the actuating member 81 opposite the compressed actuating member 81, enables a reciprocating or oscillating movement of the filter 79 about the spindle 80. The reciprocating movement of the filter 79 is shown by arrow A. As with the other actuators discussed herein, preferably the actuating members 80 are comprised of an electrically responsive material such as EAP or some other polymeric material that can be stimulated by application of some form of electricity.

Figures 9A, 9B, 9C:
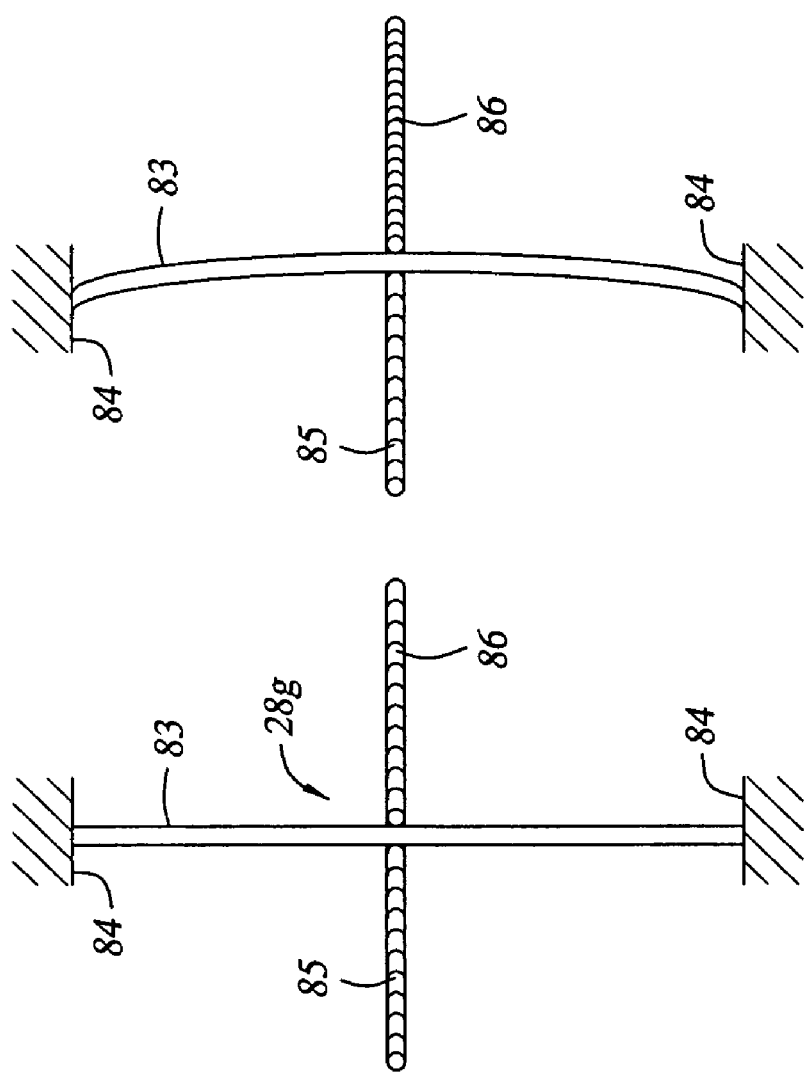
FIGS. 9a-9c portray a sideview of an embodiment of an actuator capable of producing an acoustic signal.

FIGS. 9a through 9c illustrate how a downhole actuator 28g can be used as an acoustic source. Here a tympanic member 83 is shown connected on opposite ends within supports 84 and having a first member 85 and a second member 86 connected along the length of the tympanic member 83 between the supports 84. FIG. 9a shows both the first and second member (85,86) in a relaxed state without the application of any applied electricity. FIG. 9b shows the second member 86 in a compressed state due to the application of electricity thereby pulling the tympanic member towards the side having the second member 86. Similarly FIG. 9c shows how the first member 85 reacts to external electrical stimulation by being compressed, this is done in conjunction with relaxation of the second member 86 thereby allowing the tympanic member 83 to bulge in a direction of the first member 85.

Successive repeated reciprocation of the tympanic member caused by stimulation and relaxation of the first and second member (85,86) can thereby oscillate the tympanic member 83. The oscillation of the member 83 in turn can impart a compressional shock wave into the media (such as air or liquid) surrounding the member thereby producing an acoustic signal that is transmitted from the actuator 28g. Such an acoustic signal can be quite useful downhole in terms of producing sound waves within the wellbore used for analyzing formations, casings, tubing, and any other thing that is situated in a subterranean local. Accordingly, the tympanic member 83 can be used in the form of a speaker to create such acoustic signals. The tympanic member 83 can also be formed to respond to any acoustic signals it receives and be deformed in the manner as shown in 9b or 9c. The corresponding contraction or expansion of the first or second member (85,86), can be measured by their corresponding electrical impulses, thereby producing an electrical symbol that can be measured and recorded that might be representative of the acoustic signals received by the tympanic member 83. While FIGS. 9a through 9c illustrate an actuation device 28g having a first member and second member (85,86), this device can be operable with a single member attached thereto, or more than two members. Electroactive polymers could also be immersed directly into a well bore fluid to act either as a loud downhole acoustic source when electrically excited or to act as an acoustic receiver that generates electrical signals when struck by acoustic waves.

Figure 11:
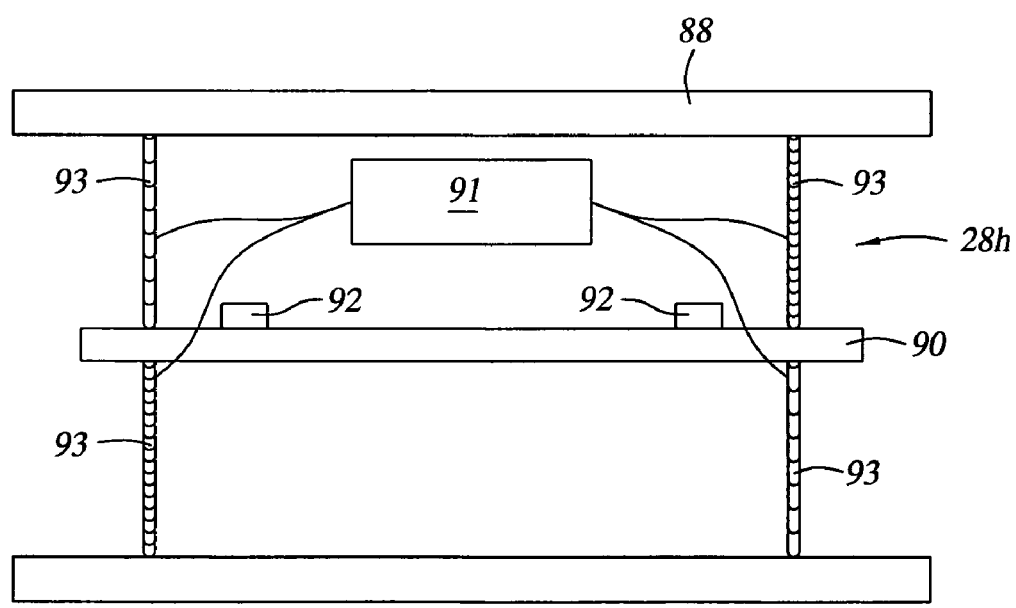
FIG. 11 is a side view of an embodiment of a vibration compensation device.

The downhole actuator 28h as shown in FIG. 11 is used for active vibration cancellation for countering vibration experienced by some sensitive components. As shown a vibration sensitive device 90, such as a printed circuit board, or other device sensitive to shock, is shown disposed within a upper and lower pressure housing (88,89). Provided on the device 90 are accelerometers 92 used for detecting the shock, vibration, or general acceleration imparted to this vibration sensitive device 90 during downhole use. A feedback circuit 91 is shown in electrical communication with compensating members 93. The compensating members provide support between the vibration sensitive device and the upper and lower housing (88,89). Based upon the readings from the accelerometers 92, the feedback circuit can provide a stimulating electrical signal to anyone of these compensating members 93 thereby moving the vibration sensitive device 90 to compensate for any shock, vibration, or possibly damaging acceleration experienced during use of this module. While the feedback circuit 91 is shown in direct electrical communication with the compensating members 93, the communication between these two items can be accomplished hard wired as shown, but also by some form of telemetry either now known or later developed in the art. The feedback circuit tries to minimize the acceleration that is experienced by the accelerometers that are attached to the object 90 by independently moving the two ends of the object 90 in the opposite directions to which each accelerometer is reporting acceleration. That is, the feedback circuit applies a different voltage to each of the electroactive polymers 93 where the voltage sign and magnitude are instantly selected to counteract local the direction and magnitude of the accelerometer-perceived motions.

Figure 12:
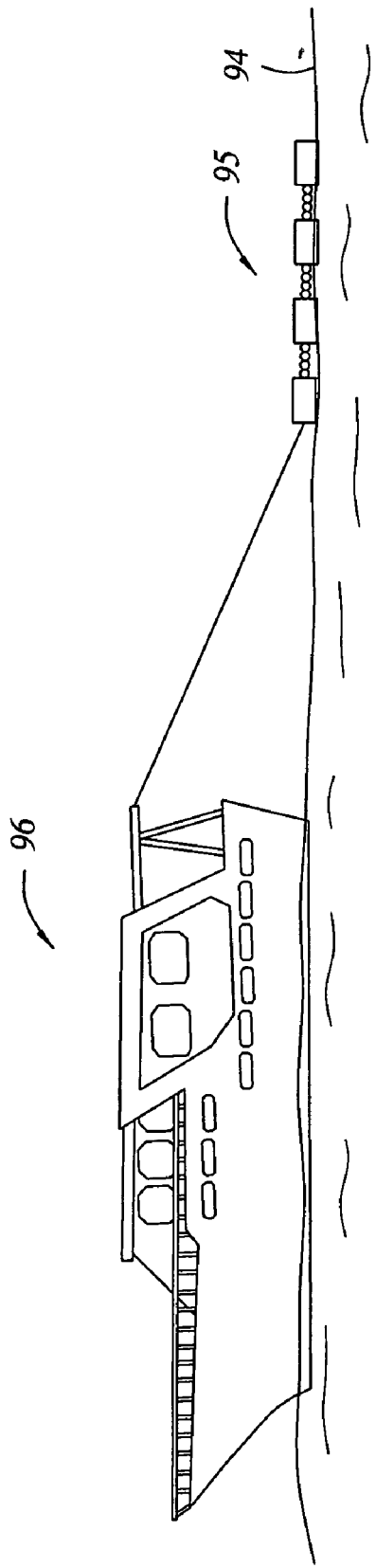
FIG. 12 illustrates a perspective view of an air gun array.

With reference now to FIG. 12, that figure illustrates a prior art system for acoustic well bore imaging. The system comprises an air gun array 95 that is towed behind a vessel 96. As is known in the art, the air guns are generally towed through some body of water 94, such as a lake, a marshland, or open sea, and compressed gas, such as air is stored within the individual air guns of the array 95, wherein the compressed gas is discharged from the guns into the body of water 94. Subsequent creation and collapse of the air bubbles released from the air guns creates a seismic signal that travels through the body of water 94 and into a subterranean formation 8 that is just below the body of water 94. The resulting seismic signal can be received and recorded by devices disposed in a well bore 5 that is formed within the formation 8.

Figure 13:
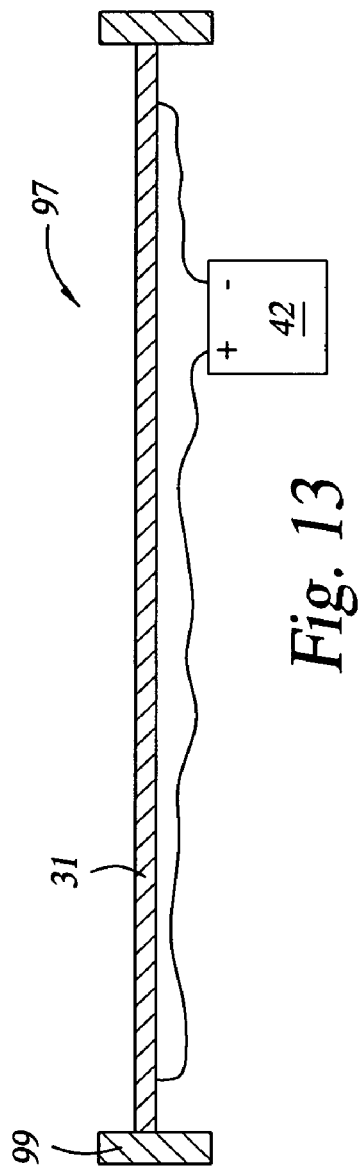
FIG. 13 is a side view of a marine acoustic source.

With reference now to FIG. 13, wherein one embodiment of an acoustic source is shown in a cross sectional view. The acoustic source 97 is comprised of an electrically responsive material 31, bounded on its outer periphery to a support 99. Preferably, the electrically responsive material 31 is affixed to the support 99 at its outer periphery and any currently known or later developed means of attachment. The configuration of the support 99 can either be rectangular, or circular, or any other desired shape or use has an acoustic source. Similar to the system of FIG. 12, the acoustic source of FIG. 13 can be towed behind a vessel, alternatively it can be suspended from a crane on an offshore drilling rig or in a land pit filled with water or buried several feet in to the earth or sitting on the sea bed.

Also shown in FIG. 13, is an electrical source 42 with its positive and negative leads in electrical communication with portions of the electrically responsive material 31. In operation of the acoustic source 97 of FIG. 13, this configuration is placed is a body of water, much like the air gun array of FIG. 12, and an electrical source is provided to the electrically responsive material 31 from the electrical supply 42. Upon application of the electrical supply, the electrically responsive material 31 can expand outward in a semi-circular like fashion into the surrounding body of water 94. Each movement of the electrically responsive material 31 into the body of water 94 is capable of producing a seismic source into the body of water. These seismic sources produce signals within the body of water 94 by the expansion and contraction of the electrically responsive material 31. The signals can travel through the water and ultimately be recorded by seismic recording devices disposed in a subterranean location.

Percussion acoustic sources (air gun, explosion, etc.) generate acoustic impulses that contain many frequencies, especially higher frequencies in the kilohertz range. However, only a small fraction of their energy is expended to produce low frequencies, (those less than 100 Hertz and particularly those less than 50 Hertz) i.e. frequencies that can travel long distances (such as 1000 feet to several miles) through subterranean formations. The higher frequencies are simply attenuated too strongly over long distances (although they can be useful over short distances of a few feet as occurs in acoustic well logging). Thus most of the percussion source energy is wasted in high frequencies that are unusable for any long distance subterranean application. However, an electroactive polymer can be excited at just one frequency (such as 50 Hertz or 100 Hertz) so that all of the energy put into the transducer produces a signal in the frequency range that is most useful for exploration purposes, whether it be a long distance or short distance application. Optionally, for seismic purposes the electroactive polymer could be excited at a particular sweep frequency over a time period by starting at a low frequency such as about 5 Hz, then sweeping to a higher frequency such as about 1000 Hz, or vice versa.

One advantage of using the acoustic source 97 over that of the prior art devices is that the responsiveness of the embodiment of the acoustic source shown in FIG. 13 far exceeds that of currently known marine acoustic devices. For example some period of time must take place between successive operations of the air guns that make up an air gun array 95. Ultimately this can therefore result in a collection of more discreet data thereby providing more accurate and comprehensive formation analysis results.

Figure 14:
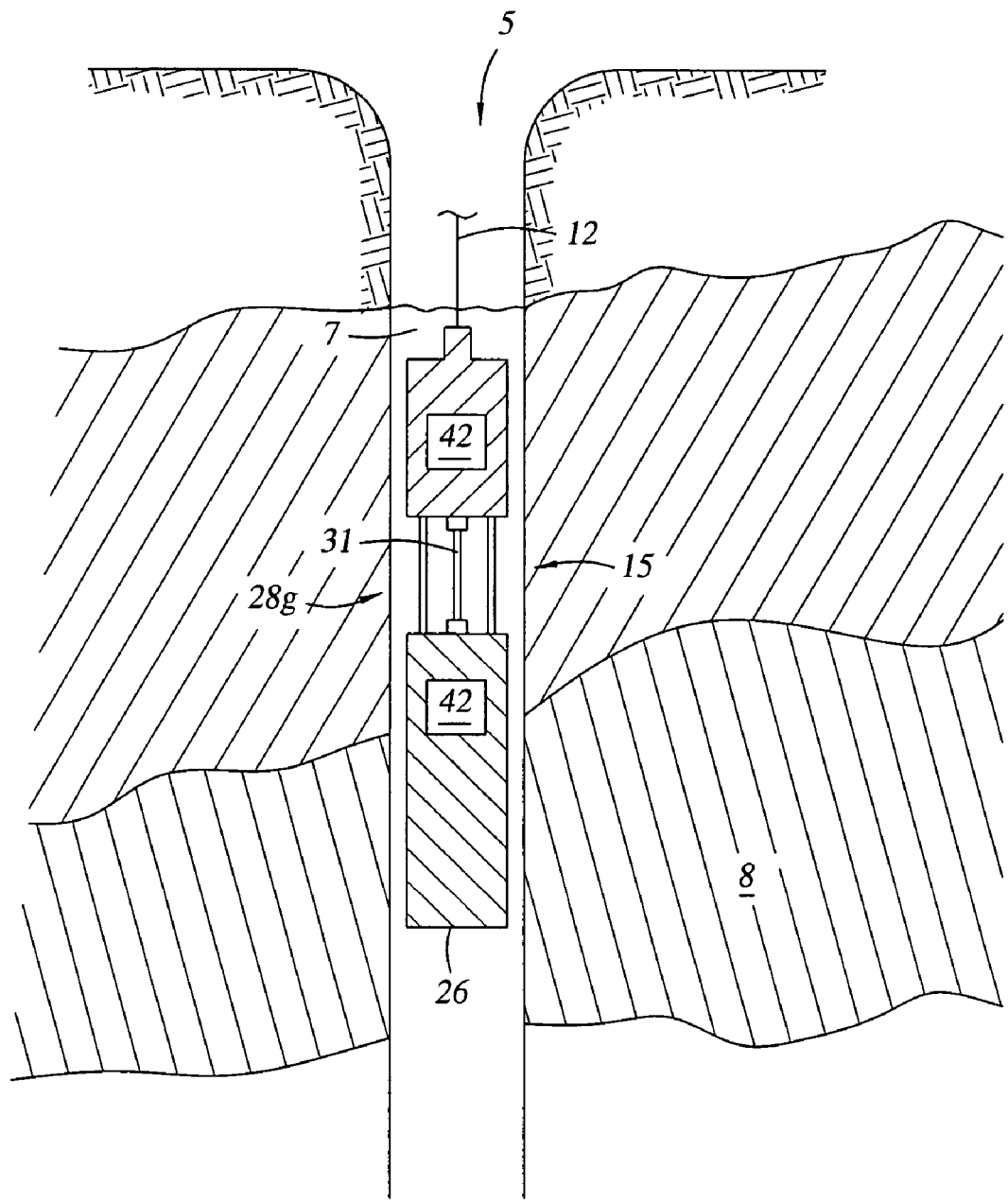
FIG. 14 portrays a partial cutaway side view of an acoustic device.

As shown in FIG. 14 is another embodiment of an acoustic source having a downhole actuator 28g. Here the downhole actuator 28g is comprised of an electrically responsive material 31 disposed between supports within a sonde 26. Moreover the sonde 26 is disposed in a well bore 5 and submerged within well bore fluid 7. Also included within the sonde 26 is an electrical source 42 for providing electrical energy to the electrically responsive material 31. In operation of the embodiment of FIG. 14, electrical energy is supplied to the electrically responsive material 31 by the electrical source 42, thereby expanding the electrically responsive material 31. It should be pointed out that in the embodiment shown in FIG. 14, in the region of the sonde 26 surrounding the electrically responsive material 31 well bore fluid 7 is allowed to enter the sonde 26 thereby contacting the outer surface of the electrically responsive material 31. Accordingly upon expansion of the electrically responsive material 31 due to the applied electrical energy, the motion of the expansive responsive material 31 onto the fluid creates a seismic signal within the well bore fluid 7. As shown, the seismic signal is in the form of acoustic waves 15 propagating within the well bore fluid 7. In turn, the seismic signal within the well bore fluid 7 travels from the fluid and into the formation 8 adjacent the well bore 5. The seismic signals, as is known, can travel into the formation wherein a portion of the signals are reflected back within the well bore. Recording devices can be disposed within the well bore 5 or on the surface, for recording an analysis of these signals in order to help determine well bore structure and parameters.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An actuator housed in a sonde and operable in a wellbore, the actuator comprising:

an electroactive polymer in communication with an electrical source;

a valve disposed in the wellbore and connected to the electroactive polymer, the valve selectively opened and closed in response to electricity supplied to the electroactive polymer, the valve comprising a valve body, a passage formed through the valve body, a valve slide selectively slideable within the valve body, and an aperture formed through the valve slide selectively alignable with the passage.

2. The actuator of claim 1, the electroactive polymer comprising a first member coupled to the valve slide, the valve slide slideable in a first direction within the valve body in response to supplying electricity to the first member thereby contracting the first member.

3. The actuator of claim 2, the electroactive polymer comprising a second member coupled to the valve slide, the valve slide slideable within the valve body in a second direction in response to supplying electricity to the second member thereby contracting the second member.

4. The actuator of claim 1, wherein the valve is selected from the group consisting of a gate valve, a rotary valve, and a ball valve.

* * * * *